(12) United States Patent
Reuter et al.

(10) Patent No.: US 7,185,956 B2
(45) Date of Patent: Mar. 6, 2007

(54) PERFORMANCE HYDRAULIC SYSTEMS FOR HYBRID BRAKE SYSTEM

(75) Inventors: David F. Reuter, Beavercreek, OH (US); E. Wayne Lloyd, Lebanon, OH (US); Richard L. Foster, Beavercreek, OH (US); Daniel N. Borgemenke, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 169 days.

(21) Appl. No.: 10/742,537

(22) Filed: Dec. 19, 2003

(65) Prior Publication Data

US 2005/0134111 A1 Jun. 23, 2005

(51) Int. Cl.
*B60T 8/32* (2006.01)
(52) U.S. Cl. .................. 303/116.1; 303/116.4
(58) Field of Classification Search ............. 303/113.1, 303/113.2, 113.3, 113.4, 113.5, 116.1, 116.2
See application file for complete search history.

(56) References Cited

U.S. PATENT DOCUMENTS

| | | | | |
|---|---|---|---|---|
| 3,630,577 A | * | 12/1971 | Davis ....................... | 303/118.1 |
| 3,650,573 A | * | 3/1972 | Inada et al. ............... | 303/114.3 |
| 4,095,848 A | * | 6/1978 | Kondo ..................... | 303/2 |
| 4,840,435 A | * | 6/1989 | Steffes ..................... | 303/113.1 |
| 5,207,487 A | * | 5/1993 | Holzmann et al. ....... | 303/113.2 |
| 5,445,445 A | * | 8/1995 | Yukio ....................... | 303/113.5 |
| 5,568,962 A | * | 10/1996 | Enomoto et al. ........ | 303/3 |
| 5,979,998 A | * | 11/1999 | Kambe et al. ........... | 303/116.1 |
| 6,238,019 B1 | * | 5/2001 | Okazaki et al. .......... | 303/146 |
| 6,402,264 B1 | * | 6/2002 | Otomo ..................... | 303/115.4 |

FOREIGN PATENT DOCUMENTS

WO WO 0066410 11/2000

* cited by examiner

*Primary Examiner*—Christopher P. Schwartz
(74) *Attorney, Agent, or Firm*—Scott A. McBain

(57) ABSTRACT

A braking system including a pre-charge with a plurality of pumps disposed in parallel with respect to one another. The pumps can direct pressurized brake fluid to the brakes during a controlled braking maneuver. The pumps operate with offset operating cycles such that a first pump is drawing fluid while a second pump is pushing fluid to the brakes. The invention provides an embodiment having three pumps operated in parallel, wherein the pumps define operating cycles offset 120 degrees from one another. The invention also provides a separate master cylinder reservoir feed circuit to improve response of the system, especially cold weather response.

11 Claims, 3 Drawing Sheets

PERFORMANCE HYDRAULIC SYSTEMS FOR HYBRID BRAKE SYSTEM

TECHNICAL FIELD

The invention relates to a hybrid braking system for a vehicle and, more specifically, the invention provides an apparatus for reducing pump pulsations in the brake pedal during controlled braking maneuvers and for improving cold temperature performance.

BACKGROUND OF THE INVENTION

A braking system of a vehicle can include a control unit for exercising control over the braking system of the vehicle under certain conditions. For example, during movement of the vehicle the control unit can receive signals from various sensors and, based on a control program stored in memory, control the operation of various parts of the braking system including pumps and valves. Specifically, the controller can receive signals from sensors, wherein the signals correspond to existing driving conditions. The controller can receive the signals and quantify the existing driving conditions. These quantified conditions are compared to predetermined values by a processor of the control unit and command signals are emitted in response to these comparisons. Reasons for taking control of the braking system generally relate to enhancing or optimizing vehicle dynamics or reducing stopping distances.

Improvements have been forthcoming in the evolution of hydraulic braking circuits for hybrid brake systems. These have included both standard and integrated pre-charged versions. Although cold temperature performance is enhanced with integrated pre-charge, some operators of vehicles may also wish to have reduced pump pulsations in the brake pedal to improve driving comfort.

SUMMARY OF THE INVENTION

The present invention provides a braking system for a vehicle including a master cylinder having a reservoir, a first fluid line for communicating fluid between the reservoir and the brake disposed at the wheel, a second fluid line for communicating fluid between the reservoir and the inlet of a plurality of pumps disposed in parallel along the second fluid line. The second fluid line delivers brake fluid to the brake at the wheel during a controlled braking maneuver. Each of the plurality of pumps can define an operating cycle wherein fluid is drawn into the pump and discharged out of the pump. The respective operating cycles of the plurality of pumps are offset with respect to one another. For example, a first pump can be drawing fluid from the reservoir while a second pump is discharging fluid to the brake. The braking system according to the present invention can also include a separate master cylinder reservoir feed circuit to the plurality of pumps to improve cold temperature response.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings, wherein like reference numerals refer to like parts throughout several views and wherein.

DESCRIPTION OF THE PREFERRED EMBODIMENT

Figure 1:
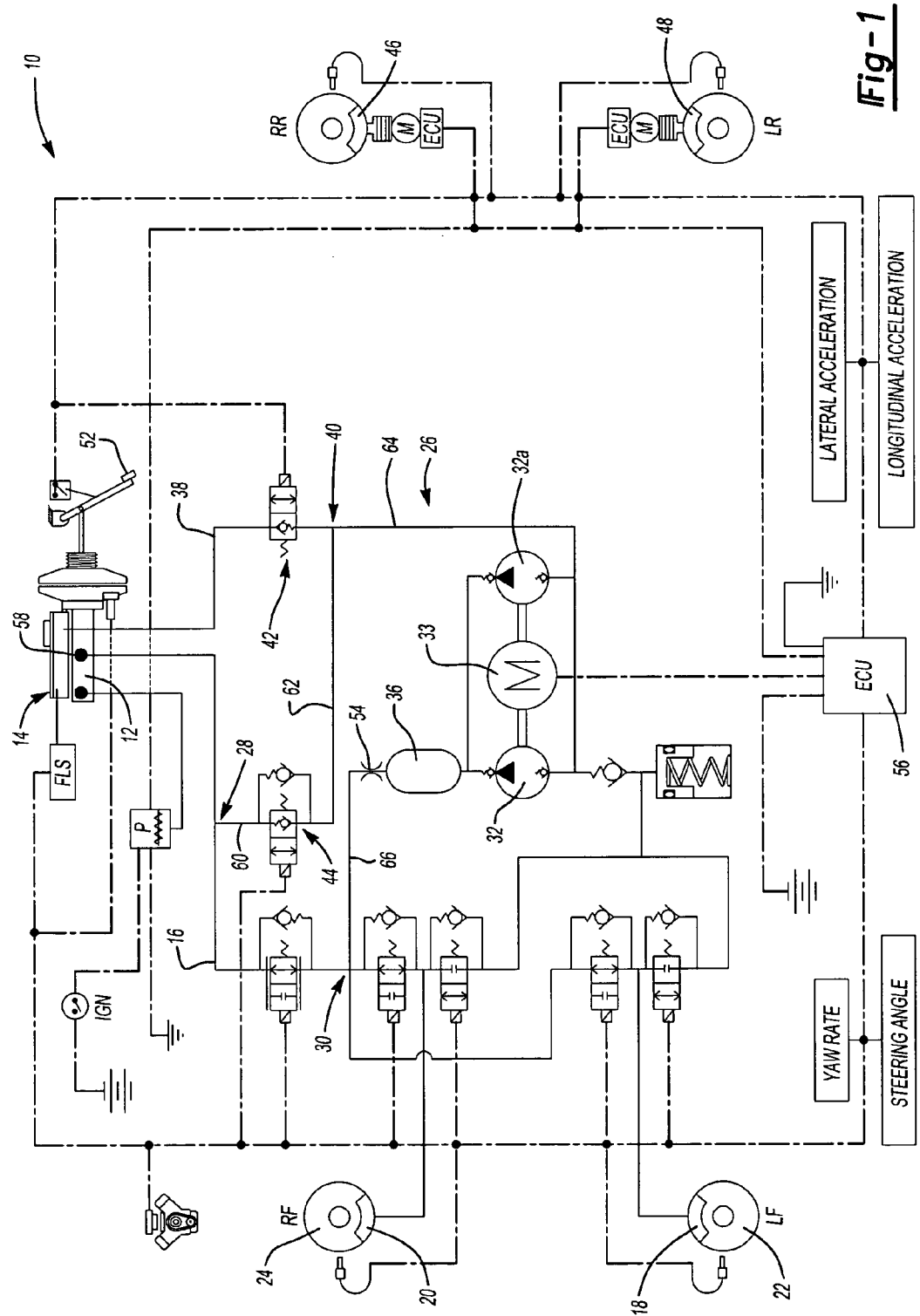
FIG. 1 is a schematic illustration of a braking system according to a first exemplary embodiment of the invention.

Referring now to FIG. 1, the invention provides a braking system 10 for a vehicle. The system 10 includes a master cylinder assembly including master cylinder 12 in communication with a reservoir 14. A first fluid path or line 16 extends between a primary port 58 of the master cylinder 12 and one or more brakes 18, 20 disposed at respective wheels 22, 24. The line 16 can be defined by fluid lines, fittings, line connectors and valves. In the exemplary embodiment of the invention, the first fluid line 16 is part of a master cylinder primary circuit. A master cylinder to wheel circuit isolation valve and a plurality of wheel brake apply valves are shown positioned along the fluid line 16. The braking system 10 is shown as a Front/Rear/Rear system wherein both front brakes are controlled by a single circuit and rear, electrically-actuated brakes 46, 48. However, the invention is not limited to the exemplary embodiment shown but can be incorporated with any configuration of braking system including a pre-charge.

A second fluid path or line 26 extends between a first position 28 along the first fluid line 16 and a second position 30 along the first fluid line 16. In the exemplary embodiment of the invention, the second fluid line 26 includes line portions 60, 62, 64, 66. A master cylinder to pump prime valve 44 is disposed between line portions 60 and 62. Line portions 62 and 64 are fluidly connected to one another at point 40. Pumps 32 and 32a are disposed in parallel to one another between line portions 64 and 66. A pump damper chamber 36 and an orifice 54 are shown disposed along the second fluid line 26, and more specifically between line portion 66 and the pumps 32, 32a. The pump damper chamber 36 and the orifice 54 can reduce the amplitude of pressure pulsations passing through the system 10. Pressurized brake fluid is delivered to the line portion 66 by the pumps 32 and 32a through the damper chamber 36 and orifice 54. Fluid is pressurized by the pumps 32, 32a and is therefore at a higher pressure in line portion 66 than in line portions 62, 64 during operation of the pumps 32, 32a.

Each of the plurality of pumps 32, 32a defines a repeating operating cycle in which fluid is drawn into the pumps 32, 32a at a first pressure and is urged out of the pumps 32, 32a at a second, higher pressure. The operation of each pump 32, 32a is controlled such that the operating cycles of the pump are offset with respect to one another. For example, the fluid pump 32 can be urging pressurized fluid to the line portion 66 while the fluid pump 32a is drawing fluid from the line portion 64.

The pumps 32, 32a can be sized similar to a single pump used in prior art systems and be modified to deliver an equivalent flow rate. For example, the pumps 32, 32a can be piston pumps and the stroke of the piston in each of the pumps 32, 32a can be approximately one-half the stroke of a piston of single pump. The single pump would generate greater displacements of fluid for each stroke as compared to each of the individual pumps 32, 32a, resulting in relatively greater fluid pressures during each stroke. In other words, the single pump of the prior art system would generally generate half the pressure pulsations of the pair of pumps 32, 32a, however, the amplitude of each pulsation would be greater than the amplitude of individual pulsations generated by each of the pumps 32, 32a.

Figure 2:
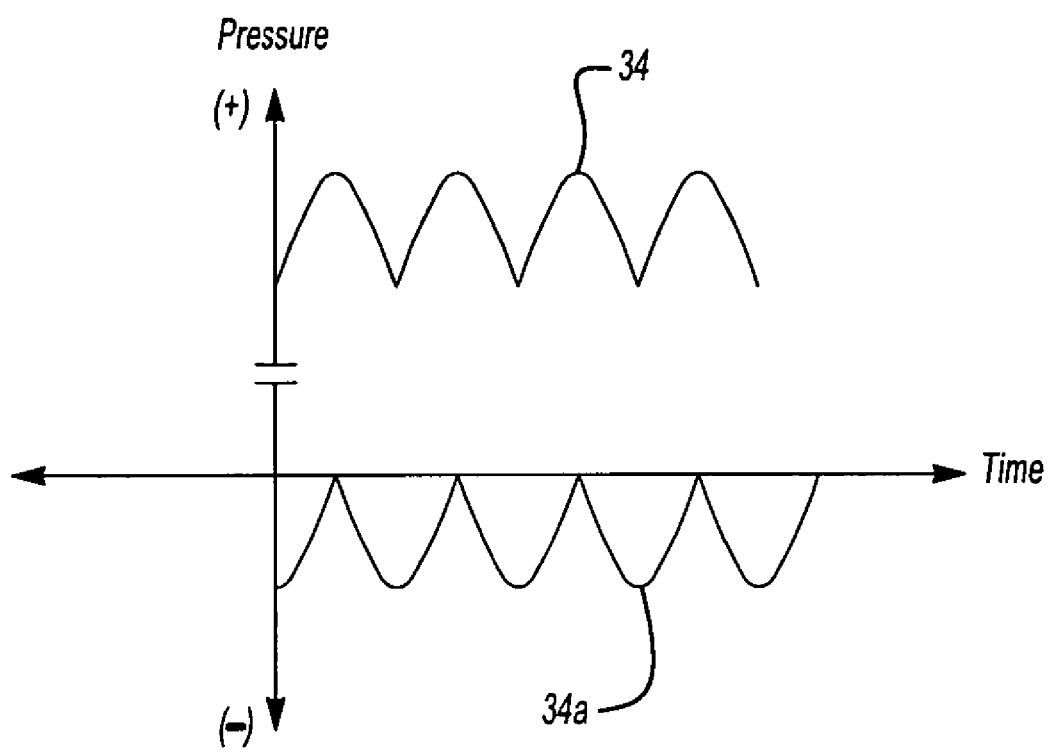
FIG. 2 is a graph showing fluid pressure over the operating cycles of pumps according to the first exemplary embodiment of the invention.

In operation, offsetting the operating cycles of the pumps 32, 32a substantially reduces the amplitude of fluid pressure pulsations passing through the system 10, especially at a brake pedal 52 of the system 10. FIG. 2 is a graph schematically showing a first line or truncated wave 34 generally representing fluid pressure in the line portion 66 during operation of the system 10. The x-axis demarcates time. The line 34 defines a plurality of cycles, each cycle starting when the line 34 is at a minimum pressure value and ending after the line 34 has reached a maximum pressure value and returned to the minimum pressure value. Every other cycle corresponds to the pressure increase in the fluid line 66 associated with one of the pumps 32, 32a discharging pressurized fluid to the line 66. Adjacent cycles correspond to a first of the pumps 32, 32a discharging fluid and a second of the pumps 32, 32a discharging fluid.

In the prior art methods using a single pump, a graphical line representing pressure at the single pump outlet defines gaps between adjacent cycles since pressurized fluid is not delivered to the fluid line portion downstream of the single pump when the single pump is drawing fluid to be pressurized. In addition, the amplitude of a cycle in the prior art pressure graph is greater than the amplitude of the cycles defined by line 34 since the flow rate demanded of the prior art system must be satisfied by fewer pump discharges. In other words, the amplitude of the line 34 is reduced by the arrangement of a plurality of pumps 32, 32a arranged in parallel to one another. For example, the amplitude of a cycle of the line 34 is approximately one half of the amplitude of a cycle of a graphical line representing pressure in a prior art, single pump system.

A second line 34a represents the fluid pressure in the line portion 64 during operation and corresponds to vacuum created when the pumps 32, 32a draw fluid. Another benefit of the present invention is that vacuum at the inlet of the pumps 32, 32a is more consistent. The line 34a defines a plurality of cycles, each cycle starting when the line 34a is at a maximum pressure value and ending after the line 34a has reached a minimum pressure value and returned to the maximum pressure value. Every other cycle corresponds to the pressure decrease in the fluid line 64 associated with one of the pumps 32, 32a drawing fluid from the line 64. Adjacent cycles correspond to a first of the pumps 32, 32a drawing fluid and a second of the pumps 32, 32a drawing fluid. At least one of the pumps 32, 32a is likely drawing fluid at all times. The wave 34a is closer to the x-axis since the negative pressure or vacuum in the line portion 64 is not as great as the pressure of fluid in the line portion 66.

In the prior art methods using a single pump, a graphical line representing pressure at the single pump inlet defines gaps between adjacent cycles since fluid is not drawn from the fluid line portion upstream of the single pump when the single pump is discharging pressurized fluid. In addition, the amplitude of a cycle in the prior art pressure graph is greater than the amplitude of the cycles defined by line 34a since the flow rate demanded of the prior art system must be satisfied by fewer pump discharges. In other words, the amplitude of the line 34a is reduced by the arrangement of a plurality of pumps 32, 32a arranged in parallel to one another. For example, the amplitude of a cycle of the line 34a is approximately one half of the amplitude of a cycle of a graphical line representing pressure in a prior art, single pump system.

Maintaining a more steady vacuum at the inlet of the pumps 32, 32a, as provided by the present invention, substantially reduces energy losses associated with starting and stopping a fluid stream moving through the various fluid paths extending between the master cylinder 12 or reservoir 14 and the pumps 32, 32a which results in improved pump flows and operating efficiencies.

In the preferred embodiment of the invention, the operating cycles are offset 180 degrees from one another. In other words, one of the pumps 32, 32a is drawing fluid while the other pump 32, 32a is urging fluid to the brakes 18, 20. However the invention can be practiced wherein the operating cycles 34, 34a are offset less than 180 degrees from one another. The operating cycles of the plurality of pumps 32, 32a are controlled to minimize pressure pulsations.

Figure 3:
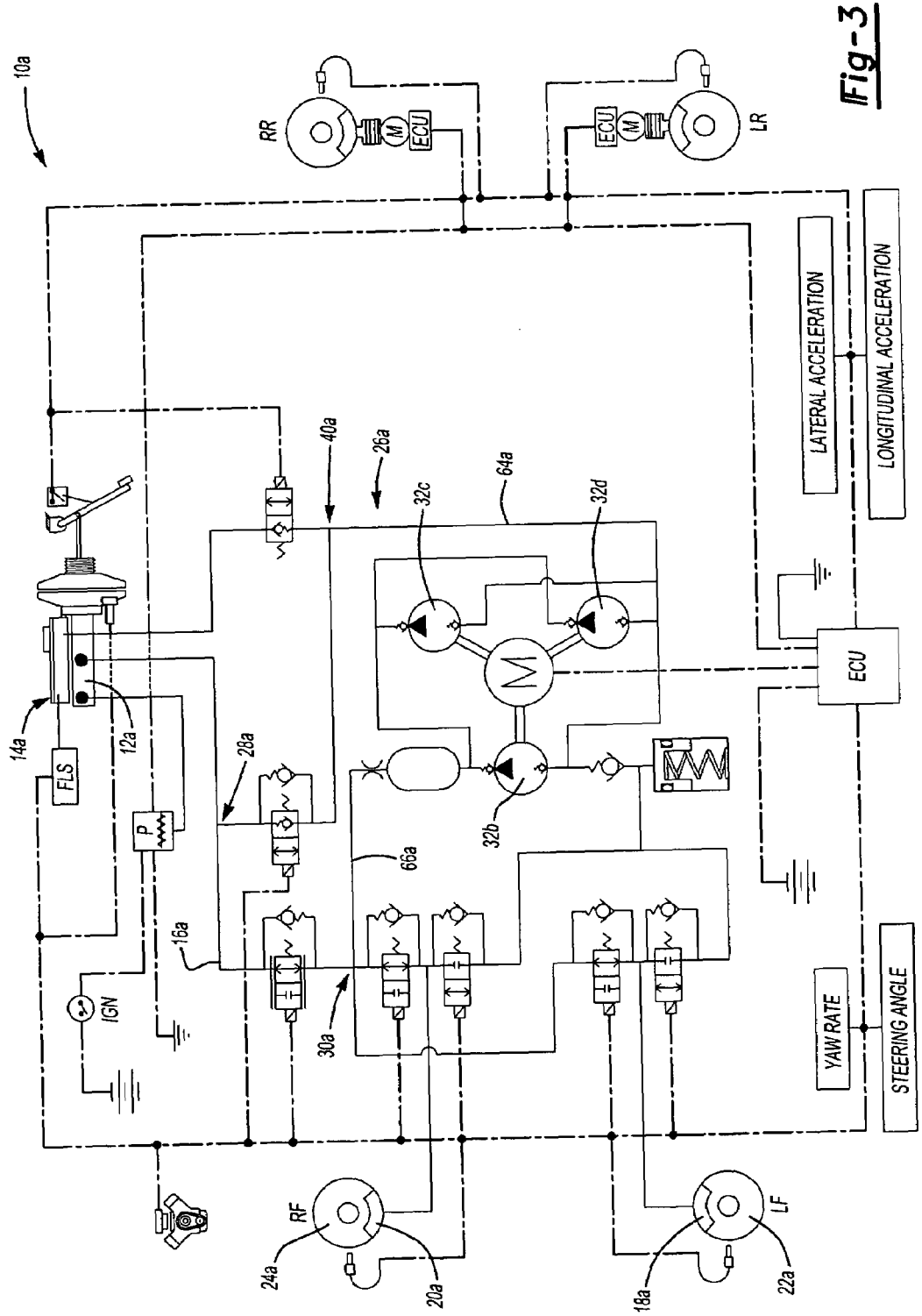
FIG. 3 is a schematic illustration of a braking system according to a second exemplary embodiment of the invention.

FIG. 3 shows a second exemplary embodiment of the invention including three pumps 32b, 32c, 32d. The brake system 10a includes a master cylinder 12a communicating with a reservoir 14a. A first fluid line 16a extends between the reservoir 14a and one or more brakes 18a, 20a disposed at wheels 22a, 24a. A second fluid line 26a extends between a first position 28a along the first fluid line 16a and a second position 30a. The plurality of fluid pumps 32b, 32c, 32d are disposed in parallel with respect to one another along the second fluid line 26a.

Each of the pumps 32b, 32c, 32d defines a repeating operating cycle in which fluid is drawn into the pump 32b, 32c, 32d at a first pressure and is urged out of the pump 32b, 32c, 32d at a second, higher pressure. The operating cycles of the pumps 32b, 32c, 32d can be offset 120 degrees from one another. For example, two of the pumps 32b, 32c, 32d can be drawing fluid while the third of the pumps 32b, 32c, 32d can be urging fluid to the brakes 18a, 20a. The operation of the pumps 32b, 32c, 32d can be controlled so that the fluid pressure in line portions 66a, 64a varies over time as shown by lines 34, 34a, respectively, in FIG. 2.

The pumps 32b, 32c, 32d can be sized similar to a single pump used in prior art systems and be modified to deliver an equivalent flow rate. For example, the pumps 32b, 32c, 32d can be piston pumps and the stroke of the piston in each of the pumps 32b, 32c, 32d can be approximately one-third the stroke of a piston of single pump. The single pump would generate greater displacements of fluid for each stroke as compared to each of the individual pumps 32b, 32c, 32d, resulting in relatively greater fluid pressures during each stroke. In other words, the single pump of the prior art system would generally generate one third of the pressure pulsations of the three pumps 32b, 32c, 32d, however, the amplitude of each pulsation would be greater than the amplitude of the individual pressure pulsations generated by each of the pumps 32b, 32c, 32d.

Referring again to FIG. 1, the invention also provides a third fluid line 38 to define a separate feed circuit to the pumps 32, 32a to enhance the operation of the system 10. The fluid line 38 can improve the cold temperature response of the system especially during braking operations in which the driver of the vehicle is not engaging the brake pedal and the pumps 32, 32a act as suction pump. The fluid line 38 can communicate fluid from the reservoir 14 to the line portion 64 at the first position 40 along the second fluid line 26. The fluid line 38 can be larger than the other fluid lines 16, 26 of the system to reduce the restriction acting against fluid movement between the reservoir 14 and the pumps 32, 32a. By way of example and not limitation, the fluid line 38 can be a 10 millimeter hose and the other fluid line portions 60, 62, 64, 66 can be 6 millimeter brake lines.

A first prime valve 42 is disposed along the third fluid line 38 between the reservoir 14 and the first position 40. In the exemplary embodiment of the invention, the valve 42 is a solenoid check valve set in a first position when de-energized to prevent fluid from moving to the reservoir 14. The valve 42 can be selectively moved to a second position when energized to reduce the restriction acting against fluid movement from the reservoir 14 to the pumps 32, 32a. A second prime valve 44 is disposed along the second fluid line 26 between the line portions 60, 62. In the exemplary embodiment of the invention, the prime valve 44 is a solenoid check valve set in a first position when de-energized to prevent the high pressure of the master cylinder primary circuit from entering inlets to pumps 32, 32a in base brake operation. The valve 44 moves to the open position when energized to reduce the restriction acting against fluid movement from the line 16 to the pumps 32, 32a. The first and second prime valves 42, 44 are energized during a controlled braking event to provide parallel flow paths to the inlets of pumps 32, 32a. The first prime valve 42 can be larger than the second prime valve 44 for the same electrical energy consumption since it is only exposed to reservoir inlet pressures.

A controller 56 can control the motor 33 to control the operation of the pumps 32, 32a. The controller 56 can also control the movement of the valves 42, 44. The controller 56 can control the motor 33 and valves 42, 44, in accordance with a program stored in memory to enhance the deceleration of the vehicle.

The present invention can also be used in a braking system having an Front/Front/Rear/Rear configuration. An embodiment of the invention used in combination with an Front/Front/Rear/Rear system would include a plurality of pumps disposed in each of the separate hydraulic circuits. The present invention can be used with any braking system having a pre-charge.

While the invention has been described as referenced to two exemplary embodiments, it will be understood by those skilled in the art that various changes may be made and equivalents may be substituted for elements of the exemplary embodiments without departing from the scope of the invention. In addition, many modifications may be made to adapt a particular situation or material to the teachings of the invention without departing from the central scope of the invention. Therefore, it is intended that the invention not be limited to the particular embodiments disclosed as the best mode contemplated for carrying out the invention, but that the invention will include all embodiments falling within the scope of the claims.

The invention claimed is:

1. A braking system for a vehicle comprising:
 a master cylinder assembly of a vehicle including a master cylinder in fluid communication with a fluid reservoir;
 a first fluid line extending between said master cylinder and a brake disposed at a wheel of said vehicle;
 a second fluid line extending between a first position along said first fluid line and a second position along said first fluid line;
 a plurality of fluid pumps disposed in parallel with respect to one another along said second fluid line;
 a third fluid line extending from said reservoir to a first position along said second fluid line;
 a first solenoid operated prime valve with internal check valve disposed along said third fluid line between said reservoir and said first position along said second fluid line; and
 a second solenoid operated prime valve with internal check valve disposed along said second fluid line between said first position along said first fluid line and said first position along said second fluid line.

2. The braking system of claim 1 wherein said check valves are biased in opposite directions.

3. The braking system of claim 1 wherein said third fluid line is larger than said second fluid line.

4. The braking system of claim 1 wherein said first and third fluid lines extend at least partially parallel with respect to one another.

5. The braking system of claim 1 wherein said second and third fluid lines extend at least partially parallel with respect to one another.

6. The braking system of claim 1 wherein said first and third fluid lines are spaced from one another.

7. The braking system of claim 1 wherein said first position of said second fluid line is disposed along said second fluid line between said first position of said first fluid line and said plurality of pumps.

8. The braking system of claim 1 wherein said second and third fluid lines are sized differently with respect to one another.

9. The braking system of claim 1 wherein said third fluid line extends directly from said fluid reservoir.

10. The braking system of claim 1 wherein each of said plurality of fluid pumps define a respective operating cycles wherein fluid is drawn into each respective said pump and discharged out of each said pump and said respective operating cycles of each of said plurality of pumps are offset with respect to one another such that at least one of said plurality of fluid pumps is drawing fluid while another of said plurality of fluid pumps is discharging fluid.

11. The braking system of claim 1 including a fluid chamber disposed along said second fluid line downstream of said plurality of fluid pumps.

* * * * *